United States Patent
Ammler

(10) Patent No.: US 10,584,792 B2
(45) Date of Patent: Mar. 10, 2020

(54) METHOD FOR OPERATING A FLUID-GUIDING DEVICE, AND CORRESPONDING FLUID-GUIDING DEVICE

(71) Applicant: AUDI AG, Ingolstadt (DE)

(72) Inventor: Stefan Ammler, Bergheim (DE)

(73) Assignee: AUDI AG, Ingolstadt (DE)

(*) Notice: Subject to any disclaimer, the term of this patent is extended or adjusted under 35 U.S.C. 154(b) by 368 days.

(21) Appl. No.: 15/523,751

(22) PCT Filed: Nov. 3, 2015

(86) PCT No.: PCT/EP2015/075605
§ 371 (c)(1),
(2) Date: May 2, 2017

(87) PCT Pub. No.: WO2016/071342
PCT Pub. Date: May 12, 2016

(65) Prior Publication Data
US 2017/0321800 A1 Nov. 9, 2017

(30) Foreign Application Priority Data
Nov. 6, 2014 (DE) .................. 10 2014 016 421

(51) Int. Cl.
*F16H 61/12* (2010.01)
*F16H 61/00* (2006.01)
(Continued)

(52) U.S. Cl.
CPC ............. *F16H 61/12* (2013.01); *F04B 23/00* (2013.01); *F04B 49/065* (2013.01); *F04B 49/20* (2013.01);
(Continued)

(58) Field of Classification Search
CPC ...... F16H 57/0436; F16H 61/12; F04B 23/00; F04B 23/02; F04B 49/065; F04B 49/20; F04B 51/00; F04D 15/0066
See application file for complete search history.

(56) References Cited

U.S. PATENT DOCUMENTS

| | | | |
|---|---|---|---|
| 2007/0163626 A1* | 7/2007 | Klein | ................... A47L 15/0049 134/56 D |
| 2011/0044823 A1* | 2/2011 | Stiles | ...................... F04B 49/20 417/42 |

(Continued)

FOREIGN PATENT DOCUMENTS

| | | |
|---|---|---|
| CN | 103370248 A | 10/2013 |
| DE | 69905945 T2 | 12/2003 |

(Continued)

OTHER PUBLICATIONS

Office Action dated May 25, 2018 in corresponding Chinese Application No. 201580060214.0; 14 pages.

(Continued)

*Primary Examiner* — Dominick L Plakkoottam
(74) *Attorney, Agent, or Firm* — Maier & Maier, PLLC

(57) ABSTRACT

A device and method for operating a fluid-guiding device, including an electrically operated fluid pump, which delivers fluid from a fluid sump of the fluid-guiding device and supplies it to at least one fluid consumer. A fluid volume in the fluid sump as well as a current intensity of the electric current taken up by the fluid pump and modeled on the basis of the rotational speed of the fluid pump are ascertained, and a comparison value is determined from the modeled current intensity. A deficient fluid supply of the fluid-guiding device is inferred if the fluid volume is greater than a threshold value and a measured current intensity of the electric current taken up by the fluid pump is less than the comparison value.

7 Claims, 2 Drawing Sheets

(51) Int. Cl.
| | |
|---|---|
| *G05D 7/06* | (2006.01) |
| *F16H 57/04* | (2010.01) |
| *F04B 49/06* | (2006.01) |
| *F04B 49/20* | (2006.01) |
| *F04B 23/00* | (2006.01) |
| *F04B 51/00* | (2006.01) |
| *F04D 15/00* | (2006.01) |

(52) U.S. Cl.
CPC .......... *F04B 51/00* (2013.01); *F04D 15/0066* (2013.01); *F16H 57/0436* (2013.01); *F16H 57/0447* (2013.01); *F16H 61/0031* (2013.01); *G05D 7/0676* (2013.01); *F16H 2061/1264* (2013.01)

(56) References Cited

U.S. PATENT DOCUMENTS

| | | | | |
|---|---|---|---|---|
| 2012/0063921 | A1* | 3/2012 | Stiles, Jr. | F04D 15/0066 417/42 |
| 2013/0121849 | A1* | 5/2013 | Long | B60W 10/023 417/53 |
| 2014/0100413 | A1* | 4/2014 | Casas | A61M 1/1086 600/16 |
| 2017/0082244 | A1* | 3/2017 | Gale | F04B 51/00 |

FOREIGN PATENT DOCUMENTS

| | | |
|---|---|---|
| DE | 102004033414 A1 | 2/2006 |
| DE | 102008043130 A1 | 4/2010 |
| DE | 102011053176 A1 | 2/2013 |
| DE | 102011082635 A1 | 3/2013 |
| DE | 102012222189 A1 | 6/2013 |
| EP | 0220164 A2 | 4/1987 |
| EP | 2035248 B1 | 8/2010 |
| WO | 2006136320 A1 | 12/2006 |

OTHER PUBLICATIONS

International Search Report (ISR) issued in corresponding PCT/EP2015/075605 dated Feb. 12, 2016; 4pgs.

German Examination Report issued in corresponding DE 10 2014 016 421.7 dated Nov. 18, 2015; 7pgs.

Translation of the International Preliminary Report on Patentability dated May 18, 2017, in connection with corresponding international Application No. PCT/EP2015/075605 (7 pgs).

* cited by examiner

METHOD FOR OPERATING A FLUID-GUIDING DEVICE, AND CORRESPONDING FLUID-GUIDING DEVICE

FIELD

The invention relates to a method for operating a fluid-guiding device, comprising an electrically operated fluid pump, which delivers fluid from a fluid sump of the fluid-guiding device and supplies it to at least one fluid consumer. The invention further relates to a fluid-guiding device.

BACKGROUND

The fluid-guiding device is, for example, a gearbox or transmission mechanism of a motor vehicle and thus it is associated in particular with a drive system of the motor vehicle. Of course, the fluid-guiding device can also be used in another context, however. The fluid-guiding device configured as a transmission mechanism serves to produce an operative connection between a drive device of the motor vehicle and at least one driven axle or wheels of the motor vehicle.

The transmission mechanism is preferably provided to adjust one transmission ratio selected from a plurality of different transmission ratios, so that the operative connection between the drive device and the at least one axle is present with this transmission ratio. The drive device comprises at least one drive assembly, preferably an internal combustion engine. Of course, the drive device may also provide several drive assemblies, wherein a first of these drive assemblies is present, for example, in the form of the internal combustion engine and a second of these drive assemblies is present as an electrical machine or electric motor.

The transmission mechanism comprises several driving gears or speeds, each speed being associated with one of the transmission ratios. For example, several of the speeds are present as forward speeds and at least one of the speeds is present as a reverse speed. The transmission mechanism can be designed either as a manual shifting gearbox or as an automatic transmission. In the latter case, it can be present in the form of a converter automatic transmission, a continuously variable transmission, a semiautomatic gearbox, or an automated manual gearbox. More preferably, the transmission mechanism can be designed as a dual-clutch transmission.

The fluid-guiding device provides a fluid pump, especially a coolant pump or lubricant pump, which is or can be electrically operated. The fluid pump is accordingly associated preferably with an electric motor, which serves as its drive unit. The fluid pump is provided in order to deliver fluid, especially coolant or lubricant, from the fluid sump of the fluid-guiding device, especially from the coolant sump or lubricant sump of the transmission mechanism, and then supply it to the at least one fluid consumer or coolant consumer or lubricant consumer.

The fluid sump is preferably situated at a geodetically lowest point of the fluid-guiding device, so that fluid present in the fluid-guiding device or the transmission mechanism is moved thanks to the effect of gravity in the direction of the fluid sump. For example, the fluid consumer is present as a fluid outlet or coolant outlet or lubricant outlet, through which the fluid can be discharged. The fluid outlet can be designed as a nozzle, for example. More preferably, the fluid outlet is oriented so that at least one coupling of the fluid-guiding device and/or one wheel set of the fluid-guiding device is subjected to the expelled fluid, in particular, directly subjected to it.

SUMMARY

Now, the object of the invention is to propose a method for operating a fluid-guiding device which has advantages over the prior art, especially one which prevents damage to the fluid-guiding device due to lack of fluid.

It is provided that a fluid volume in the fluid sump as well as a current intensity of the electric current taken up by the fluid pump and modeled on the basis of the rotational speed of the fluid pump are ascertained, and a comparison value is determined from the modeled current intensity, wherein a deficient fluid supply of the fluid-guiding device is inferred if the fluid volume is greater than a threshold value and a measured current intensity of the electric current taken up by the fluid pump is less than the comparison value. The determining of the modeled current intensity can take into account not only the rotational speed of the fluid pump, but also a temperature, especially a temperature of the fluid.

Accordingly, at first the fluid volume and the modeled current intensity are ascertained. The fluid volume corresponds to the volume or the quantity of fluid present in the fluid sump. More preferably, the fluid volume is modeled, i.e., ascertained with the aid of a model. The modeled current intensity is determined by means of the rotational speed of the fluid pump and/or the temperature, especially the fluid temperature. This means that a model is present, having as input variable at least the rotational speed of the fluid pump and/or the temperature and putting out as the output quantity the modeled current intensity. The modeled current intensity corresponds to the presumed current intensity of the electric current taken up by the fluid pump at the instantaneously existing rotational speed and/or temperature.

Next, from the modeled current intensity the comparison value is determined. For example, the comparison value corresponds to the modeled current intensity. Alternatively, however, a mathematical relation, a characteristic field and/or a table can also be used in order to determine the comparison value from the modeled current intensity. Furthermore, the instantaneously existing current intensity of the electric current taken up by the fluid pump is measured. Suitable means are provided for this purpose.

Next, on the one hand, the fluid volume is compared to the threshold value and, on the other hand, the measured current intensity is compared to the comparison value. A check is made to see if the fluid volume is greater than the threshold value. Moreover, a check is made to see whether the measured current intensity deviates from the comparison value, in particular, whether it is smaller than the latter. If both conditions are fulfilled, a deficient fluid supply of the fluid-guiding device is inferred and accordingly it is assumed that too little fluid is present in the fluid-guiding device.

If a deficient fluid supply is identified, suitable countermeasures can be initiated. On the one hand, for example, a signal device can be actuated in order to notify the driver of the vehicle as to the deficient fluid supply of the fluid-guiding device. In addition or alternatively, the fluid-guiding device and/or the drive device can be placed in an emergency mode, in which only a reduced power is made available to propel the motor vehicle.

A preferred embodiment of the invention calls for determining the fluid volume by means of a model. This embodiment was already mentioned above. Thus, no provision is made to measure the fluid volume present in the fluid sump by suitable means, such as a sensor. Of course, however, this may in fact be precisely the case as an alternative, so that the method for checking the plausibility of the measured values of the sensor as explained in the course of the specification can be utilized.

Another embodiment of the invention calls for reducing the fluid volume per unit of time by a removal volume determined with the help of the rotational speed of the fluid pump and/or increasing the fluid volume per unit of time by a feed volume determined based on the temperature. The model by which the fluid volume instantaneously present in the fluid sump is at least approximately determined is based on relatively simple operations. Thus, the fluid volume is reduced by the determined removal volume, this being provided in each unit of time, i.e., a defined period of time.

The removal volume is preferably an absolute value and accordingly has a positive value. Of course, however, it can also have a negative value and can be added to the fluid volume per unit of time. Basically any desired unit of time can be chosen. Preferably, however, it has a value resulting at least approximately in a steady course of the fluid volume over time. The unit of time, for example, can be infinitesimally small in a mathematical respect, so that the removal volume exists in the form of a gradient over time. The removal volume is ascertained based on the rotational speed of the fluid pump. The rotational speed of the fluid pump is at least approximately proportional to the quantity of fluid removed from the fluid sump per unit of time.

In addition or alternatively, the fluid volume per unit of time is increased by the feed volume determined based on the temperature. Basically the foregoing remarks in regard to the removal volume apply analogously to the feed volume. The feed volume is also preferably an absolute value and accordingly it has a positive value. For example, the feed volume increases as the temperature increases. The temperature used is, for example, the temperature of the fluid-guiding device or a fluid temperature of the fluid.

The viscosity of the fluid depends directly on the temperature. This means that at higher temperatures, the fluid has less viscosity and accordingly can flow more easily and therefore faster in the direction of the fluid sump. Hence, the feed volume ascertained from the temperature can indicate, at least approximately, the quantity of fluid that is added to the fluid sump per unit of time.

Especially preferably, both the removal volume and the feed volume are used in the modeling of the fluid volume. Thus, per unit of time, the fluid volume is both reduced by the removal volume and increased by the feed volume. This yields an adequate approximation, at least for the present method, of the fluid volume actually present in the fluid sump.

A preferred embodiment of the invention calls for the modeled fluid volume to be bounded at the bottom by a minimum value and/or at the top by a maximum value. Because the fluid volume is only being modeled, it might take on values which are not meaningful under certain circumstances if there are no limits. Accordingly, the fluid volume is bounded by the minimum value and/or the maximum value, preferably by both. In the latter case, accordingly, the modeled fluid volume is always present in an interval which is enclosed between the minimum value and the maximum value.

An enhancement of the invention calls for setting the fluid volume during a startup operation of the fluid-guiding device at an initial value ascertained on the basis of the standing time of the fluid-guiding device. By the startup operation of the fluid-guiding device is meant, for example, a time point at which the fluid-guiding device, especially the fluid pump, is placed back in operation a certain standing time, especially a standing time of the motor vehicle. The standing time of the fluid-guiding device is thus the period of time since an end of operation of the fluid-guiding device immediately preceding the startup operation, at which time the fluid-guiding device, especially the fluid pump, was taken out of operation. It is especially important that the fluid pump is nonoperational during the standing time of the fluid-guiding device.

Using the foregoing remarks analogously, from the standing time it is thus possible to infer the quantity of fluid which has reached back into the fluid sump during the standing time, especially due to the effect of gravity. From the standing time of the fluid-guiding device one first determines the initial value and then sets the fluid volume at this value. Then, according to the foregoing remarks, the fluid volume can be calculated with the aid of the model, especially by using the removal volume and/or the feed volume. If the standing time of the fluid-guiding device is below a certain minimum standing time, it can be assumed that only a (slight) portion of the fluid has gone back into the fluid sump. Accordingly, in this case the initial value can be set at the above-described minimum value. For example, the minimum value corresponds to that fluid quantity which is permissible as a minimum in the fluid-guiding device or a fraction thereof.

In another embodiment of the invention, the modeled current intensity is ascertained based on the rotational speed of the fluid pump and/or the temperature by means of a mathematical relation, a characteristic field, and/or a table. Thus, the current intensity is either dependent upon the rotational speed of the fluid pump or the temperature. In particular, the modeled current intensity is preferably dependent on both the rotational speed and the temperature. The rotational speed and/or the temperature serve as input variables for the mathematical relation, the characteristic field and/or the table. From these, the modeled current intensity is obtained as the output variable.

An especially preferred embodiment calls for adapting the mathematical relation, the characteristic field and/or the table at least once, preferably periodically, with the measured current intensity. Thus, the model by which the modeled current intensity is determined is adapted to the actual circumstances of the fluid pump, especially the actually measured current intensity. For this purpose, the rotational speed of the fluid pump and/or the temperature, on the one hand, and the measured current intensity, on the other hand, are detected. These variables are then transferred to the mathematical relation, the characteristic field, and/or the table, so that the modeled current intensity resulting with the use of the same rotational speed and/or temperature corresponds to the measured current intensity. The adapting is carried out at least once, for example. More preferably, however, it is carried out periodically, especially at certain intervals of time and/or under certain conditions.

An enhancement of the invention calls for ascertaining the comparison value from the modeled current intensity by using a variable offset and/or a constant offset. The comparison value thus does not correspond directly to the modeled current intensity. Instead, it is adjusted by the offset. One can use the variable offset on the one hand and the constant offset on the other hand for this. The variable offset has a definite value resulting from at least one operating parameter and/or a state variable of the fluid-guiding device. On the other hand, the constant offset has a certain uniform value. For example, the variable offset is subtracted from the modeled current intensity in order to arrive at the comparison value, while the constant offset is added or subtracted. If both offsets are used, the comparison value corresponds to the modeled current intensity reduced by the variable offset and increased or reduced by the constant offset.

For example, a deficient fluid supply is inferred under the condition that the measured current intensity is less than the comparison value which is ascertained by subtraction of the constant offset. On the other hand, if the measured current intensity is larger than the comparison value, especially the comparison value ascertained by addition of the constant offset, one can infer a sufficient fluid supply. With the help of the constant offset, accordingly, it is possible to realize a behavior resembling a hysteresis. Thus, it is possible to avoid an alternating finding of a deficient fluid supply and no deficient fuel supply caused by slight fluctuations.

For example, one can thus determine two comparison values, a first comparison value being ascertained by subtraction of the constant offset and a second comparison value by addition of the constant offset. The measured current intensity is now compared with the two comparison values. If it is smaller than the first comparison value, a deficient fluid supply is recognized. If it is greater than the second comparison value, the fuel supply is sufficient.

Finally, in another embodiment of the invention, it can be provided that the variable offset is ascertained as a function of the rotational speed of the fluid pump. Thus, the rotational speed is used as the operating parameter or state variable. For example, the variable offset increases as the rotational speed of the fluid pump increases.

The invention further relates to a fluid-guiding device, especially to carry out the method according to the preceding remarks, comprising an electrically operated fluid pump, which delivers fluid from a fluid sump of the fluid-guiding device and supplies it to at least one fluid consumer. It is provided that the fluid-guiding device is designed to ascertain a fluid volume in the fluid sump as well as a current intensity of the electric current taken up by the fluid pump modeled on the basis of the rotational speed of the fluid pump and to determine a comparison value from the modeled current intensity, wherein a deficient fluid supply of the fluid-guiding device is inferred if the fluid volume is greater than a threshold value and a measured current intensity of the electric current taken up by the fluid pump is less than the comparison value.

The advantages of such an embodiment of the fluid-guiding device or of such a method have already been pointed out. Both the fluid-guiding device and the corresponding method can be enhanced according to the preceding remarks, so that reference is made to them in this regard.

BRIEF DESCRIPTION OF THE DRAWINGS

The invention shall be explained in more detail below based on the exemplary embodiments represented in the drawings, without this limiting the invention. The figures show.

DETAILED DESCRIPTION

Figure 1:
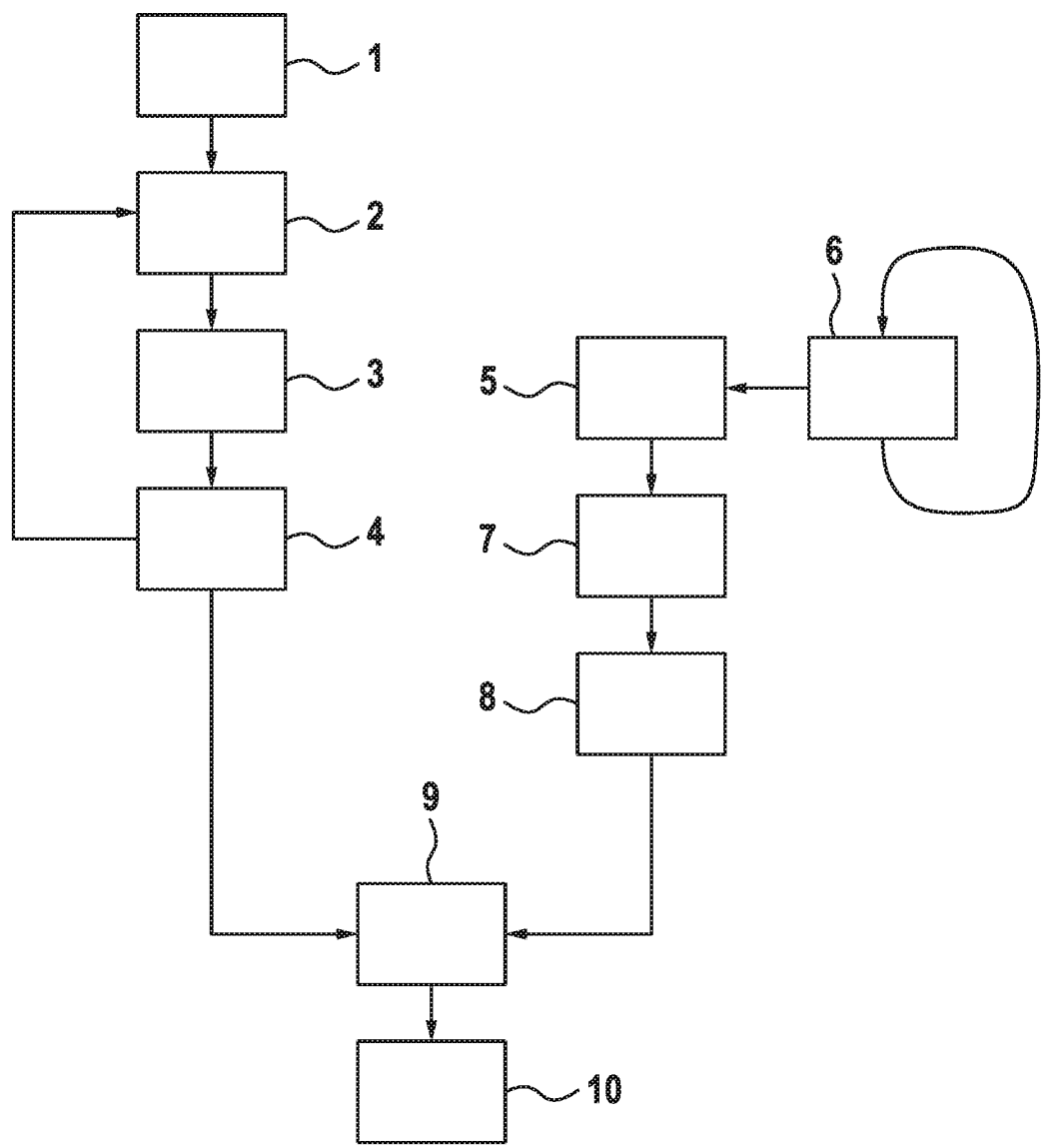
FIG. 1: a flow chart of a method for operating a fluid-guiding device.

FIG. 1 shows a flow chart of a method for operating a fluid-guiding device. The device provides an electrically operated fluid pump, which delivers fluid from a fluid sump of the fluid-guiding device and supplies it to at least one fluid consumer, for example a fluid outlet.

First of all, by means of a model, a fluid volume in the fluid sump is ascertained. For this, in a step 1, an initial value is determined for the fluid volume and the fluid volume is set at this initial value. The initial value, for example, is ascertained based on standing time of the fluid-guiding device. Preferably, the initial value increases as the standing time of the fluid-guiding device increases. The standing time is ascertained, for example, by means of a timekeeper, especially a controller of the fluid-guiding device. Next, in a step 2, the fluid volume is reduced by a removal volume. In a step 3, on the other hand, the resulting fluid volume is increased by a feed volume.

While the removal volume, for example, depends directly on the rotational speed of the fluid pump, preferably the feed volume is determined based on a temperature. The temperature corresponds, for example, to a temperature of the fluid-guiding device, especially a fluid temperature of the fluid. Then, in a step 4, the modeled fluid volume is bounded at the bottom by a minimum value and at the top by a maximum value, so that the modeled fluid volume lies in an interval enclosed between the minimum value and the maximum value. This procedure is repeated, starting from step 2. Preferably, steps 2, 3 and 4 occur during a given unit of time and are permanently repeated until an end of operation of the fluid-guiding device is reached. The unit of time corresponds, for example, to at least 10 ms and/or at most 20 ms, at most 40 ms or at most 80 ms.

In parallel with this, in a step 5 a modeled current intensity is determined based on the rotational speed of the fluid pump. In addition, the already mentioned temperature can be used. The modeled current intensity is preferably determined from a mathematical relation, a characteristic field, and/or a table. The mathematical relation, characteristic field, and/or table can be adapted in the course of a permanently recurring step 6 by means of a measured current intensity.

For this purpose, in addition to the measured current intensity one furthermore determines the rotational speed of the fluid pump as well as the temperature, and uses these variables to adapt the relation, the characteristic field, and/or the table. Step 5 is followed immediately by step 7. In this step, the modeled current intensity is adapted by a variable offset, for example, it is reduced by the variable offset. The variable offset is preferably determined as a function of the rotational speed of the fluid pump.

The thus resulting modeled current intensity is then adapted in a step 8 with a constant offset. This is or will be established once and then remains constant. On the whole, the modeled current intensity obtained by using the variable offset and/or the constant offset yields a comparison value. This comparison value is compared in the following step 9 with the measured current intensity. At the same time, the fluid volume is compared with a threshold value. In particular, it is examined whether the fluid volume is greater than the threshold value and whether the measured current intensity is smaller than the comparison value. If these two conditions are met, a deficient fluid supply of the fluid-guiding device is recognized in the course of step 10. If such is the case, suitable countermeasures can be instituted.

With the help of the above-explained method, the presence of an adequate quantity of fluid can be inferred without a sensor to ascertain the available fluid quantity in the fluid-guiding device. In particular, a deficient fluid supply of the fluid-guiding device is recognized if the fluid quantity should not be sufficient.

Figure 2:
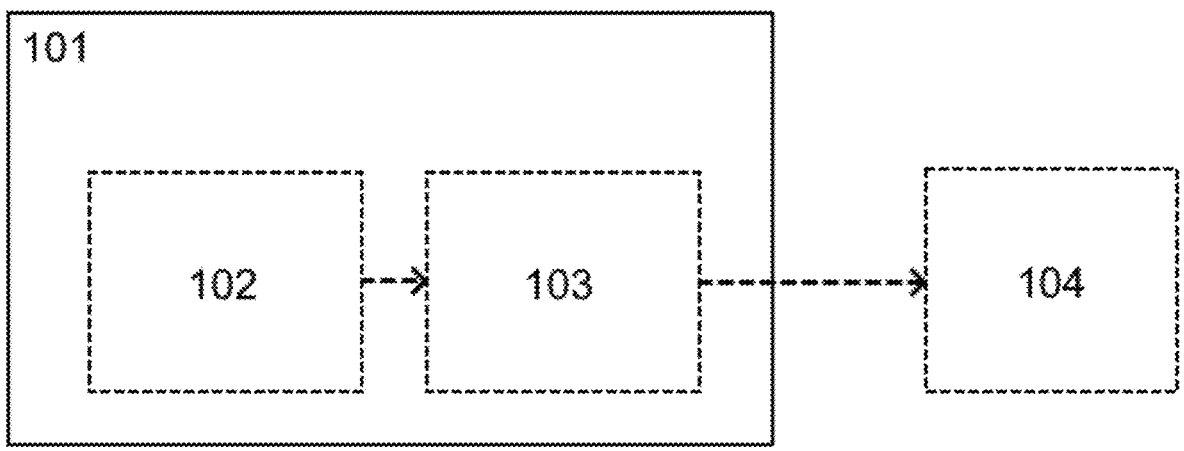
FIG. 2: a schematic diagram of an exemplary embodiment of a fluid guiding device and fluid consumer.

An exemplary embodiment of a system which may implement the above-explained method may be illustrated in the schematic diagram of FIG. 2. FIG. 2 may provide an arrangement including a fluid guiding device 101, which may include a fluid sump 102 and an electrically operated fluid pump 103, and at least one fluid consumer 104. The electrically operated fluid pump 103 may deliver fluid from the fluid sump 102 of the fluid guiding device 101 and may then supply it to at least one fluid consumer 104.

The invention claimed is:

1. A method for operating a fluid-guiding device, the fluid-guiding device comprising an electrically operated fluid pump, wherein the method comprises:

delivering fluid from a fluid sump of the fluid-guiding device and supplying it to at least one fluid consumer, determining a fluid volume per unit of time in the fluid sump based on a removal volume based on a rotational speed of the fluid pump and a feed volume based on a temperature of at least one of the fluid-guiding device and the fluid, a determination step comprising reducing the fluid volume by the removal volume and increasing the fluid volume by the feed volume;

wherein a current intensity of an electric current taken up by the fluid pump is modeled based on the rotational speed of the fluid pump, and a comparison value is determined from the modeled current intensity, wherein a deficient fluid supply of the fluid-guiding device is inferred if the fluid volume is greater than a threshold value and a measured current intensity of the electric current taken up by the fluid pump is less than the comparison value, wherein the method further comprises activating one or more countermeasures when the deficient fluid supply of the fluid-guiding device is inferred and leaving the one or more countermeasures in an inactive state when the deficient fluid supply of the fluid-guiding device is not inferred.

2. The method according to claim 1, wherein the fluid volume is provided with a lower-bound minimum value and is provided with an upper-bound maximum value.

3. The method according to claim 1, wherein during a startup operation of the fluid-guiding device, the fluid volume is set at an initial value determined based on a standing time of the fluid-guiding device.

4. The method according to claim 1, wherein the modeled current intensity is ascertained based on the rotational speed of the fluid pump and the temperature by means of a mathematical relation, a characteristic field, and a table.

5. The method according to claim 4, wherein the mathematical relation, the characteristic field, and the table are adapted at least once, preferably periodically, with the measured current intensity.

6. The method according to claim 1, wherein the comparison value is ascertained from the modeled current intensity based on an addition or subtraction of at least one offset value, wherein the at least one offset value is at least one of a constant offset having a uniform value, and a variable offset based on at least one operating parameter or measured state variable of the fluid-guiding device.

7. The method according to claim 6, wherein the variable offset is a function of the rotational speed of the fluid pump.

* * * * *